United States Patent [19]
Nitowski et al.

[11] Patent Number: 6,030,710
[45] Date of Patent: Feb. 29, 2000

[54] COPOLYMER PRIMER FOR ALUMINUM ALLOY FOOD AND BEVERAGE CONTAINERS

[75] Inventors: Gary A. Nitowski, Lower Burrell; Joseph D. Guthrie, Murrysville; Joseph P. Harenski, Export; Daniel C. Johnson, Apollo, all of Pa.

[73] Assignee: Alcoa Inc., Pittsburgh, Pa.

[21] Appl. No.: 08/885,656

[22] Filed: Jun. 30, 1997

[51] Int. Cl.$^7$ .............................. B32B 15/04; B32B 15/08; B05D 1/36
[52] U.S. Cl. ................... 428/457; 428/458; 428/461; 427/409; 427/410; 72/379.2; 72/379.4
[58] Field of Search .................... 428/35.8, 458, 428/328, 329, 331, 461, 457; 72/715, 379.2, 379.4; 427/409, 410

[56] References Cited

U.S. PATENT DOCUMENTS

| | | | |
|---|---|---|---|
| 3,276,868 | 10/1966 | Uhlig | 96/1.5 |
| 5,103,550 | 4/1992 | Wefers et al. | 29/527.4 |
| 5,238,715 | 8/1993 | Wefers et al. | 428/34.4 |
| 5,368,974 | 11/1994 | Walls et al. | 430/156 |
| 5,885,689 | 3/1999 | Hasegawa et al. | 428/141 |

FOREIGN PATENT DOCUMENTS

| | | |
|---|---|---|
| 43-17507 | 7/1968 | Japan. |
| 263668 | 5/1964 | Netherlands. |
| 471879 | 4/1969 | Switzerland. |
| 2293605 | 3/1996 | United Kingdom. |

*Primary Examiner*—Holly C Rickman
*Attorney, Agent, or Firm*—Glenn E. Klepac

[57] ABSTRACT

Aluminum alloy sheet is provided with a primer layer comprising a reaction product of aluminum oxide or hydroxide and a vinylphosphonic acid-acrylic acid copolymer, coated with a polymer coating composition containing polyvinyl chloride or an epoxy. The polymer coated aluminum alloy sheet is shaped into container bodies for food containers or container end panels for aluminum food and beverage containers.

15 Claims, 1 Drawing Sheet

COPOLYMER PRIMER FOR ALUMINUM ALLOY FOOD AND BEVERAGE CONTAINERS

FIELD OF THE INVENTION

The present invention relates to a new food container body or to a new food or beverage container end panel and to a process for forming same from aluminum alloy sheet. More specifically, the invention relates to polymer coated aluminum alloy sheet having a primer layer comprising a reaction product of an oxide or hydroxide layer and a vinylphosphonic acid-acrylic acid copolymer.

BACKGROUND OF THE INVENTION

Although aluminum protects itself against corrosion by forming a natural oxide coating, the protection is not complete. In the presence of moisture and electrolytes, aluminum alloys corrode much more rapidly than pure aluminum.

Accordingly, there is a need to treat aluminum alloy substrates with primers or other chemicals that provide improved corrosion resistance as well as strong bonding affinity for polymers.

In the prior art, chemical conversion coatings have been formed on aluminum alloys by "converting" a surface of the metal into a tightly adherent coating, part of which consists of an oxidized form of aluminum. Chemical conversion coatings provide high corrosion resistance and improved bonding affinity for polymer coatings. A chromate conversion coating is typically provided by contacting aluminum with an aqueous solution containing hexavalent or trivalent chromium ions, phosphate ions and fluoride ions. In recent years, concerns have arisen regarding the pollution effects of chromates and phosphates discharged into waterways by such processes. Because of the high solubility and strongly oxidizing character of hexavalent chromium ions, expensive waste treatment procedures must be employed to reduce the hexavalent chromium ions to trivalent chromium ions for waste disposal.

Attempts have been made in the prior art to produce acceptable chromate-free conversion coatings for aluminum. For example, some chromate-free conversion coatings contain zirconium, titanium, hafnium and/or silicon, sometimes combined with fluorides, surfactants and polymers such as polyacrylic acid. In spite of the extensive efforts that have been made previously, there is still no entirely satisfactory non-chromate conversion coating or primer for improving the adhesion and corrosion resistance of polymer coated aluminum alloy substrates.

A principal objective of our invention is to provide polymer coated aluminum alloy sheet having a primer layer comprising a reaction product of a vinylphosphonic acid-acrylic acid copolymer and an aluminum oxide or hydroxide layer on the sheet.

A related objective of our invention is to provide a primer layer for aluminum alloy sheet that is free of chromium compounds.

Additional objectives and advantages of our invention will become apparent to persons skilled in the art from the following detailed description.

SUMMARY OF THE INVENTION

Figure 1:
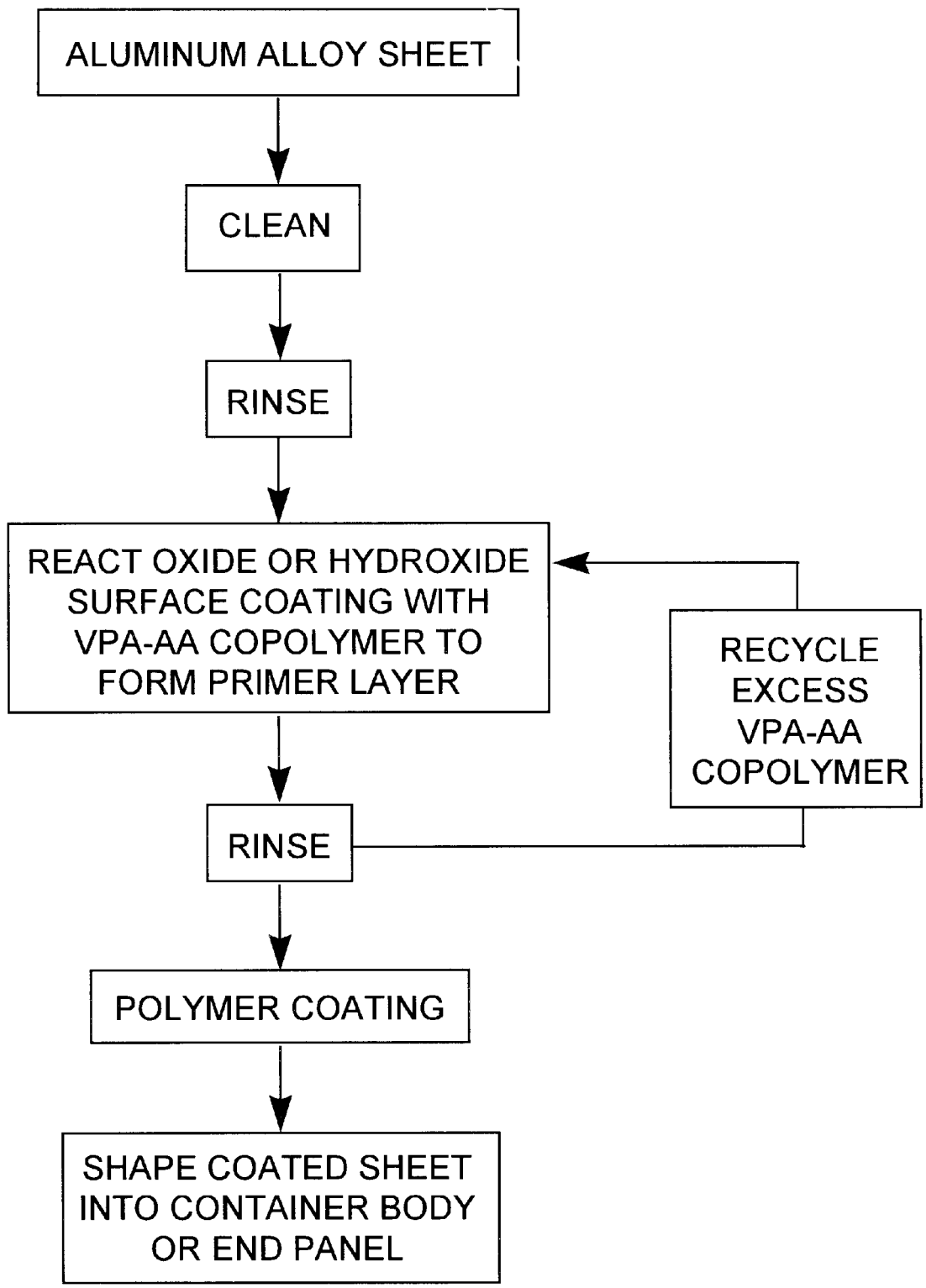
FIG. 1 is a flowsheet diagram of the process of the present invention.

In accordance with our invention, there is provided a process for making polymer coated aluminum alloy sheet suitable for shaping into a food container body or food or beverage container end panel.

Some aluminum alloys suitable for making polymer coated container bodies or container end panels include aluminum-magnesium alloys of the AA 5000 series and particularly the AA 5042 and AA 5182 alloys.

Aluminum alloys suitable for container end panels such as AA 5182 are provided as an ingot or billet or slab by casting techniques known in the art. Before working, the ingot or billet is subjected to elevated temperature homogenization. The alloy stock is then hot rolled to provide an intermediate gauge sheet. For example, the material may be hot rolled at a metal entry temperature of about 700°–975° F. to provide an intermediate product having a thickness of about 0.130 inch to 0.190 inch. This material is cold rolled to provide a sheet ranging in thickness from about 0.008 to 0.015 inch. We prefer AA 5182 aluminum alloy sheet in either the H19 or H39 temper. Aluminum alloy 5042 sheet for end panels is preferably in the H19 temper.

Aluminum alloys such as AA 5042 are provided as an ingot that is homogenized. This is followed by hot rolling to an intermediate gauge of about 0.125 inch. Typically, the intermediate gauge product is annealed, followed by hot rolling and then cold rolling to a final gauge product having a thickness of about 0.008 to 0.015 inch. The sheet is coated with a polymer and then drawn and redrawn into food container bodies. We prefer AA 5042 aluminum alloy sheet in the H2E72 temper.

The natural oxide coating on an aluminum alloy sheet surface is generally sufficient for practice of our invention. The natural oxide coating ordinarily has a thickness of approximately 30–50 angstroms. For better protection against corrosion, the oxide coating can be grown by treatments such as anodic oxidation or hydrothermal treatment in water, water vapor or aqueous solutions.

Aluminum alloy sheet of the invention is generally cleaned with an alkaline surface cleaner to remove any residual lubricant adhering to the surface, and then rinsed with water. Cleaning can be avoided if the residual lubricant content is negligible.

The cleaned sheet surface is then primed with a primer composition comprising an aqueous solution of about 1–20 g/L of a vinyl phosphonic acid-acrylic acid copolymer (VPA-AA copolymer). Solutions containing about 4–10 g/L of the copolymer are preferred. The copolymer usually comprises about 5–50 mole % vinylphosphonic acid, preferably about 20–40 mole %. A particularly preferred VPA-AA copolymer contains about 30 mole % VPA and about 70 mole % AA. The solution has a temperature of about 100°–200° F., more preferably about 20°–180° F. A particularly preferred solution has a temperature of about 170° F.

The sheet surface may be dipped into the primer composition or the composition may be roll coated or sprayed onto the sheet surface. A preferred continuous cleaning and pretreating line is operated at about 1000–1500 feet per minute. A contact time of about 6 seconds between the sheet surface and the primer composition is sufficient when the line is operated at 1000 feet per minute. The VPA-AA copolymer reacts with the oxide or hydroxide coating to form a primer layer on the sheet surface.

Optionally, the primed sheet may be rinsed with water to remove a portion of the VPA-AA copolymer unreacted with the oxide or hydroxide coating. The rinse water preferably has a temperature of about 170°–180° F. The rinse water is concentrated by removing excess water so that the VPA-AA copolymer can be recycled. Some preferred concentrating techniques include reverse osmosis and membrane filtration.

The primed sheet is coated with a polymer composition that preferably includes an organic polymer and pigment particles dispersed in an organic solvent. Three preferred coating polymers are the epoxies, polyvinyl chloride and polyesters. The suitable epoxies include phenolic-modified epoxies, polyester-modified epoxies and epoxy-modified polyvinyl chloride.

Alternatively, the primed sheet may be coated by electrocoating, slot coating or extrusion coating.

The pigment particles are preferably titanium dioxide, alumina or silica. We prefer titanium dioxide particles in the 0.5 to 10 microns median particle size range.

The polymer coated sheet is dried, coiled, and then finally shaped into container bodies or container end panels.

DETAILED DESCRIPTION OF PREFERRED EMBODIMENTS

In accordance with the present invention, some 2 in.×4 in. samples of AA 5182 aluminum alloy sheet were cleaned, primed with a vinyl phosphonic acid-acrylic acid copolymer and then coated with a polyvinyl chloride coating composition. The VPA-AA copolymer contained 30 mole % VPA units and 70 mole % AA units.

The PVC coated samples were tested for resistance to blushing and for coating adhesion. One set of samples was placed in a beer can filled with beer, the can was sealed, and then the can was heated to 180° F. for 30 minutes in a water bath. Another set of samples was immersed for 30 minutes in a deionized water bath heated to 180° F.

The test samples were removed from their test environments, rinsed with deionized water and dried. Blushing was recorded, if evident by visual observation. Coating adhesion was tested by scribing a crosshatched configuration (horizontal and vertical lines about ⅛ inch to 3/16 inch apart) through the coating to the base metal with a knife blade. A high tack tape (3M No. 610) was sealed over the crosshatched area. After 5 seconds contact time, the tape was removed rapidly by pulling at approximately a 90° angle to the metal surface. Results of the tape test with the P(VPA-AA) primer and similar tape tests with polyvinyl phosphonic acid (PVPA) and polyacrylic acid (PAA) primers are shown below.

TABLE 1

Tape Test Results

| Pretreatment | Test Environment | |
|---|---|---|
| | Beer | Water |
| PVPA-4.1 g/L 180° F. Bath | Fail | Fail |
| PVPA-7.4 g/L 180° F. Bath | Fail | Fail |
| PAA-1.0 g/L 140° F. Bath | Fail | Fail |
| PAA-7.7 g/L 140° F. Bath | Fail | Fail |
| P(VPA-AA)-4.4 g/L 180° F. Bath | Pass | Pass |
| P(VPA-AA)-7.2 g/L 180° F. Bath | Pass | Pass |

Having described the presently preferred embodiments, it is to be understood that the invention may be otherwise embodied within the scope of the appended claims.

What is claimed is:

1. A process for making polymer coated aluminum alloy sheet suitable for shaping into a food or beverage container body or container end panel, comprising:

(a) providing an aluminum alloy sheet having a surface portion comprising aluminum oxide or aluminum hydroxide;

(b) coating said surface portion with a primer composition comprising an aqueous solution consisting essentially of water and a vinylphosphonic acid-acrylic acid copolymer, thereby to form a primer layer comprising a reaction product of said copolymer and said oxide or hydroxide; and (c) coating said primer layer with a coating composition comprising a polymer selected from the group consisting of polyvinyl chloride, epoxies and polyesters.

2. The process of claim 1 further comprising:

(d) shaping said sheet into a container body or container end panel.

3. The process of claim 1 further comprising:

(d') after (b) and before (c), rinsing said sheet to remove a portion of said copolymer.

4. The process of claim 1 wherein said copolymer comprises about 5–50 mole % vinylphosphonic acid.

5. The process of claim 1 wherein said copolymer comprises about 20–40 mole % vinylphosphonic acid.

6. The process of claim 1 wherein said primer composition consists essentially of about 1–20 g/L of said copolymer dissolved in water.

7. The process of claim 1 wherein said primer composition has a temperature of about 120°–200° F. (49°–93° C.) in step (b).

8. The process of claim 1 wherein said coating composition further comprises an organic solvent.

9. The process of claim 1 wherein said coating composition further comprises particles of a pigment selected from the group consisting of titanium dioxide, silica and alumina.

10. The process of claim 1 wherein said aluminum alloy sheet comprises an aluminum-magnesium alloy of the AA 5000 series.

11. The process of claim 1 wherein said coating composition comprises polyvinyl chloride.

12. A polymer coated aluminum alloy sheet made by the process of claim 1.

13. The polymer coated aluminum alloy sheet of claim 12 comprising an aluminum-magnesium alloy of the AA 5000 series coated with a primer composition consisting essentially of a vinylphosphonic acid-acrylic acid copolymer comprising about 20–40 mole % vinylphosphonic acid and about 60–80 mole % acrylic acid, and a coating composition comprising polyvinyl chloride.

14. A process for making polymer coated aluminum alloy sheet suitable for shaping into a food or beverage container body or container end panel, comprising:

(a) providing an aluminum alloy sheet comprising an aluminum-magnesium alloy of the AA5000 series and having a surface portion comprising aluminum oxide or aluminum hydroxide;

(b) coating said surface portion with a composition comprising an aqueous solution consisting essentially of water and about 1–20 g/L of a vinyl phosphonic acid-acrylic acid copolymer, said copolymer comprising about 5–50 mole % vinyl phosphonic acid, thereby forming a layer comprising a reaction product of said copolymer and said oxide or hydroxide; and (c) coating said layer with a coating composition comprising a polymer selected from the group consisting of polyvinyl chloride, epoxies and polyesters.

15. The process of claim 14 wherein said aqueous solution consists essentially of water and about 4–10 g/L of the copolymer.

* * * * *